(12) United States Patent
Kobayashi et al.

(10) Patent No.: US 9,018,902 B2
(45) Date of Patent: Apr. 28, 2015

(54) RECHARGEABLE BATTERY CHARGING METHOD, CHARGING CONTROL APPARATUS, AND BATTERY PACK

(75) Inventors: Masayuki Kobayashi, Minamiawaji (JP); Tomomi Kaino, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 376 days.

(21) Appl. No.: 13/536,463

(22) Filed: Jun. 28, 2012

(65) Prior Publication Data

US 2013/0002200 A1    Jan. 3, 2013

(30) Foreign Application Priority Data

Jun. 29, 2011 (JP) ................... 2011-144724

(51) Int. Cl.
*H02J 7/00* (2006.01)
*H02J 7/04* (2006.01)

(52) U.S. Cl.
CPC ............ *H02J 7/0081* (2013.01); *H02J 7/0083* (2013.01); *H02J 7/045* (2013.01)

(58) Field of Classification Search
CPC ..... H02J 7/0081; H02J 7/0045; H02J 7/0083; G01R 31/362; G01R 31/3624; G01R 31/3658; G01R 19/16542

USPC ......... 320/107, 112, 116, 132, 134, 136, 149, 320/152, 157, 160
See application file for complete search history.

(56) References Cited

U.S. PATENT DOCUMENTS

| 7,609,049 B1* | 10/2009 | Tian et al. ............... 324/76.11 |
| 2009/0015209 A1 | 1/2009 | Morina et al. |
| 2011/0148426 A1* | 6/2011 | Yokotani ................. 324/434 |
| 2011/0204850 A1* | 8/2011 | Kaino ..................... 320/116 |

FOREIGN PATENT DOCUMENTS

JP    2009-044946    2/2009

* cited by examiner

*Primary Examiner* — Vuthe Siek
(74) *Attorney, Agent, or Firm* — McDermott Will & Emery LLP

(57) ABSTRACT

When maximum cell voltage remains at or below a maximum current control voltage (4200 mV), which is below the start-full-charge detection voltage (4210 mV), three consecutive times with 250 ms periodicity, set current is increased one level (128 mA). When maximum cell voltage is higher than the start-full-charge detection voltage three consecutive times with 250 ms periodicity, set current is reduced. When maximum cell voltage is higher than the start-full-charge detection voltage and charging current remains below 384 mA two consecutive times with 250 ms periodicity, the rechargeable battery is determined to be fully-charged.

7 Claims, 4 Drawing Sheets

RECHARGEABLE BATTERY CHARGING METHOD, CHARGING CONTROL APPARATUS, AND BATTERY PACK

BACKGROUND OF THE INVENTION

1. Field of the Invention

The present invention relates to a rechargeable battery charging method that charges with a given amount of set current, to a charging control apparatus, and to a battery pack.

2. Description of the Related Art

Rechargeable battery charging, as represented by lithium-ion battery charging, is performed with a set current and set voltage that are established within the limits of the maximum current and maximum voltage (the protection voltage for preventing over-charging) allowed by the rechargeable battery. Although various different techniques have been proposed to control charging in the past, charging with a set constant current until battery voltage reaches a set voltage and subsequently charging with a set constant voltage (namely, constant current-constant voltage charging) has become the predominantly accepted method.

Incidentally, it turns out that a rechargeable battery has non-negligible internal resistance. During charging, the voltage component generated by the set current flow through the internal resistance is added to the open-circuit voltage and measured as detected voltage. As a result of internal resistance, the measured battery voltage is increased during charging and reduced during discharging. Accordingly, to prevent the detected battery voltage from exceeding the maximum allowable voltage, it is desirable to set the current at the start of charging high or low according to whether the battery voltage is high or low when the battery is not being charged or discharged. It is also known that the internal resistance is high or low depending on whether the battery temperature is low or high respectively. Considering these characteristics, technology disclosed in Japanese Laid-Open Patent Publication 2009-44946 optimizes the set current at the start of charging depending on the value of the battery voltage and the battery temperature. (For example, refer to Table 1 in Japanese Laid-Open Patent Publication 2009-44946.)

Since internal resistance increases with battery degradation, the set current at the start of charging is generally adjusted to a value that is lower than a maximum current flow assumed for a nominal rechargeable battery with a relatively short time-in-service. In the case of a multi-cell battery having a plurality of series-connected battery cells (battery assembly, battery array), the maximum voltage of each cell must be prevented from exceeding the maximum allowable voltage even when cell-to-cell variation has developed due to charge-discharge cycle repetition. Therefore, the set current at the start of charging is adjusted even lower for a multi-cell battery.

In a multi-cell battery, the set voltage and/or set current may be revised according to the maximum cell voltage after charging has been started.

For example, in Japanese Laid-Open Patent Publication 2009-44946, each time the maximum cell voltage exceeds a set voltage, the set voltage and/or set current is reduced and charging continued. This technique suppresses the reduction in charging capacity (effective capacity) that arises in a multi-cell battery due to cell-to-cell voltage variation.

However, when technology disclosed in JP 2009-44946A reduces the set current at the start of charging below the maximum current flow in a nominal rechargeable battery, increase in the time to full-charge becomes unavoidable. Further, this tendency is magnified when the rechargeable battery is a multi-cell battery, and the result is contrary to the quest for reduced charging time.

The present invention was developed reflecting on the situation described above. Thus, it is an object of the present invention to provide a rechargeable battery charging method, charging control apparatus, and battery pack that can complete charging in a short time period by rapidly increasing the set current while keeping battery voltage within a range that does not exceed the maximum allowable voltage.

SUMMARY OF THE INVENTION

The rechargeable battery charging method of the present invention is a method that detects battery voltage as a time-series and charges the rechargeable battery with a given amount of set current. The method is characterized by judging whether or not the detected voltage is less than or equal to a designated voltage, which is lower than the protection voltage that protects the rechargeable battery from over-charging. If detected voltage at or below the designated voltage is judged continuously for a time period t1 or longer, the set current is increased.

The rechargeable battery charging method of the present invention judges whether or not the detected voltage is lower than the protection voltage but greater than or equal to a second voltage, which is greater than the designated voltage. If voltage within that range is judged continuously for a time period t2 or longer, the set current is reduced.

The rechargeable battery charging method of the present invention detects rechargeable battery charging current as a time-series. When the detected voltage is judged greater than or equal to the second voltage, the method judges whether or not the detected current is below a prescribed current. If detected current below the prescribed current is detected continuously for a time period t3 or longer, the rechargeable battery is determined to be fully-charged.

The rechargeable battery charging method of the present invention judges whether or not the detected voltage exceeds the protection voltage. If detected voltage exceeding the protection voltage is detected continuously for a time period t4 (t4<t1) or longer, the rechargeable battery is determined to be in an over-charged condition.

The charging control apparatus of the present invention detects battery voltage as a time-series and charges the rechargeable battery with a given amount of set current. The charging control apparatus is provided with a decision unit that judges whether or not the detected voltage is less than or equal to a designated voltage, which is lower than the protection voltage that protects the rechargeable battery from over-charging; a decision unit that judges whether or not the detected voltage is continuously judged at or below the designated voltage for a time period t1 or longer; and a unit to increase the set current when the decision unit continuously judges detected voltage at or below the designated voltage for a time period t1 or longer.

The charging control apparatus of the present invention is provided with a decision unit that judges whether or not the detected voltage is lower than the protection voltage but greater than or equal to a second voltage, which is greater than the designated voltage; a decision unit that judges whether or not the detected voltage is continuously judged within that range for a time period t2 or longer; and a unit to decrease the set current when the decision unit continuously judges detected voltage within that range for a time period t2 or longer.

The battery pack of the present invention is provided with the charging control apparatus cited above and a rechargeable battery or plurality of rechargeable batteries charged by set current increased by the charging control apparatus.

In the present invention, when rechargeable battery voltage detected as a time-series is at or below the designated voltage, which is lower than the protection voltage that protects the rechargeable battery from over-charging, continuously for the time period t1 or longer, the set current for charging the rechargeable battery is increased. Consequently, by appropriately selecting the amount of set current increase and the time interval for increased set current, rechargeable battery voltage rise can be controlled below the protection voltage even though it may rise somewhat above the designated voltage.

In the present invention, when the rechargeable battery voltage detected as a time-series is lower than the protection voltage but greater than or equal to the second voltage, which is greater than the designated voltage, continuously for the time period t2 or longer, the set current for charging the rechargeable battery is reduced. Consequently, the set current can be reduced consistent with progression towards full-charge while charging in accordance with constant current charging.

In the present invention, when the rechargeable battery voltage detected as a time-series is greater than or equal to the second voltage and charging current detected as a time-series is below a prescribed current continuously for the time period t3 or longer, the rechargeable battery is determined to be fully-charged. Consequently, full-charge can be determined by acquiring the variation in diminishing charging current near the end of charging.

In the present invention, when the rechargeable battery voltage detected as a time-series exceeds the protection voltage continuously for the time period t4 or longer, the rechargeable battery is determined to be in an over-charged condition. In this case, since the time period t4 is shorter than the previously described time period t1, rechargeable battery voltage exceeding the protection voltage can be detected prior to satisfying the conditions for increasing the set current. Accordingly, for example, rechargeable battery voltage exceeding the maximum allowable voltage can be reliably detected.

In the present invention, one or a plurality of rechargeable batteries are charged by set current increased by the previously described charging control apparatus. Accordingly, a charging control apparatus, which can keep rechargeable battery voltage from rising to the protection voltage even though it may rise somewhat above the designated voltage, is put to use in a battery pack.

With the present invention, by appropriately selecting the amount of set current increase and the time interval for increased set current, rechargeable battery voltage can be kept from rising to the protection voltage even though it may rise somewhat above the designated voltage. Accordingly, by either making the increase in set current appropriately large or the time period for increased set current appropriately short, the set current can be rapidly increased to keep battery voltage within a range that does not exceed the maximum allowable voltage. Consequently, charging time can be reduced. The above and further objects of the present invention as well as the features thereof will become more apparent from the following detailed description to be made in conjunction with the accompanying drawings.

DETAILED DESCRIPTION OF THE EMBODIMENT

Figure 1:
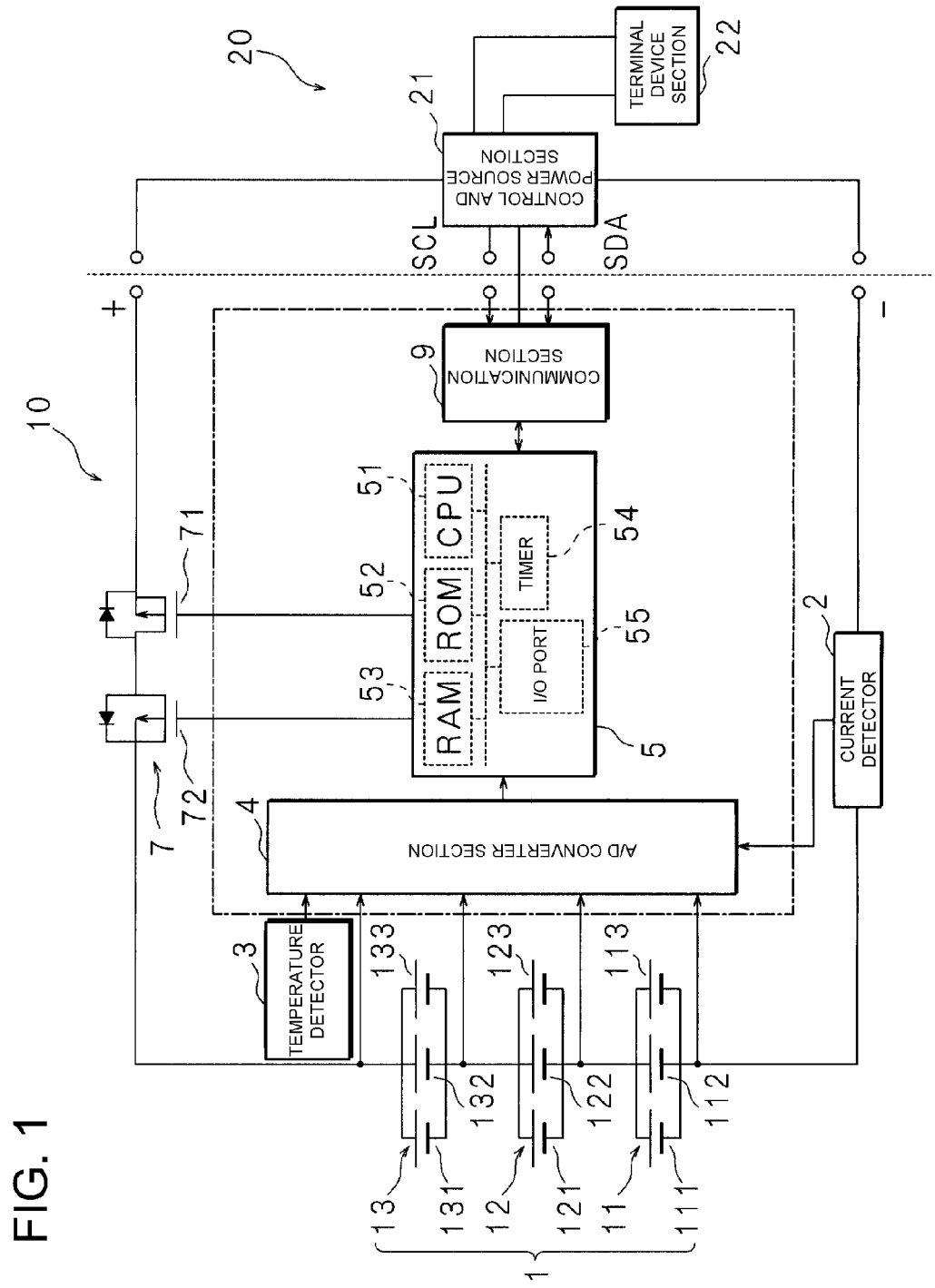
FIG. 1 is a block diagram showing an example of the structure of a battery pack for the present invention.

The following describes an embodiment of the present invention based on the figures. FIG. 1 is a block diagram showing an example of the structure of a battery pack for the present invention. The battery pack 10 of the figure attaches in a detachable manner to electrical equipment 20 such as a personal computer (PC) or other portable terminal device. The battery pack 10 is provided with a rechargeable battery 1 made up of battery cells 111, 112, 113, 121, 122, 123, 131, 132, 133 such as lithium-ion battery cells connected in parallel and in numerical order in three groups as battery blocks 11, 12, 13, which are in-turn connected in series. The positive electrode of the battery block 13 and the negative electrode of the battery block 11 become the positive and negative electrode terminals of the rechargeable battery 1.

The voltage of each battery block 11, 12, 13 is independently input to an analog input terminal of an analog-to-digital (A/D) converter section 4, and converted to a digital value that is output to a microcomputer control section 5 from the A/D converter section 4 digital output terminal. Output from a temperature detector 3 thermally coupled with the rechargeable battery 1 to detect rechargeable battery 1 temperature via circuitry including a thermistor, and output from a current detector 2 that is a resistor connected in the charging and discharging circuit path on the negative electrode terminal-side of the rechargeable battery 1 to detect charging and discharging current are also input to A/D converter section 4 analog input terminals. These detected values are also converted to digital values that are output to the control section 5 from the A/D converter section 4 digital output terminal.

Cut-off devices 7, which are P-channel metal-oxide-semiconductor field-effect transistors (MOSFETs) 71, 72, are connected in the charging and discharging path on the positive electrode terminal-side of the rechargeable battery 1 to cut-off charging and discharging current. The MOSFETs 71, 72 are connected in series with their drains connected at a common node. The diode connected between the source and drain in parallel with each MOSFET 71, 72 is the parasitic (drain-body) diode.

The control section 5 has a CPU 51. The CPU 51 is connected through a bus with read-only memory (ROM) 52 that stores information such as programs, random access memory (RAM) 53 that temporarily stores generated data, a timer 54 that times various events in parallel, and input-output (I/O) ports 55 for communication with each section in the battery pack 10. I/O ports 55 are connected with the A/D converter section 4 digital output terminal, the gate of each MOSFET 71, 72, and a communication section 9. The communication section 9 communicates with a control and power source section 21 in the electrical equipment 20. The ROM 52 is non-volatile memory such as electrically erasable programmable read-only memory (EEPROM) or flash memory. Besides operating programs the ROM 52 stores self-modifying battery capacity values, the charging and discharging cycle count, set currents, set voltages, and various other setting information. The A/D converter section 4, the control section 5, the communication section 9, and the current detector 2 make up the charging control apparatus.

The CPU 51 performs functions such as arithmetic operations and input-output operations according to a control program pre-stored in ROM 52. For example, the CPU 51 reads-in battery block 11, 12, 13 voltages and the detected charging and discharging current value with a 250 ms periodicity, integrates the remaining capacity of the rechargeable battery 1 based on the acquired voltage and detection values, and stores the results in RAM 53. Further, the CPU 51 determines the highest voltage read-in from the battery blocks 11, 12, 13 and stores it in RAM 53 (as the maximum cell voltage). Note, the period for reading-in voltage and charging and discharging current values is not limited to 250 ms. The CPU 51 also generates remaining capacity data that are written to registers (not illustrated) in the communication section 9, where that remaining capacity data are output.

During normal charging and discharging, LOW level ON signals from the I/O ports 55 are applied to the gates of the cut-off device 7 (P-channel) MOSFETs 71, 72 to enable conduction between the source and drain of each MOSFET 71, 72. In the case of rechargeable battery 1 charging current cut-off, a HIGH level OFF signal is sent from an I/O port 55 to the gate of MOSFET 71 to cut-off source-to-drain conduction. Similarly, for rechargeable battery 1 discharging current cut-off, a HIGH level OFF signal is sent from an I/O port 55 to the gate of MOSFET 72 to cut-off source-to-drain conduction. When the rechargeable battery 1 is appropriately charged, both cut-off device 7 MOSFETs 71, 72 are turned ON in a state that allows rechargeable battery 1 charging and discharging.

The electrical equipment 20 is provided with a terminal device section 22 connected to a control and power source section 21. Although not illustrated, the control and power source section 21 supplies power from a commercial power source to operate the terminal device section 22 and supply charging current to the rechargeable battery 1 charging and discharging circuit. In addition, when power is not supplied from the commercial power source, the control and power source section 21 operates the terminal device section 22 with discharging current supplied from the rechargeable battery 1 charging and discharging circuit. When the rechargeable battery 1 is made up of lithium ion batteries, the control and power source section 21 performs, for example, constant current-constant voltage charging (maximum current of approximately 0.5C to 1C, maximum voltage of approximately 4.2V/cell to 4.4V/cell). When rechargeable battery 1 voltage is greater than or equal to the voltage for starting full-charge detection, charging current is less than or equal to a prescribed current, and those conditions are continuously sustained for a given time period or longer, the rechargeable battery 1 is determined to be fully-charged.

Communication between the control and power source section 21 and the communication section 9 is implemented according to a standard such as System Management Bus (SMBus) protocol with the control and power source section 21 as the master and the communication section 9 as the slave. Here, the serial clock (SCL) is supplied by the control and power source section 21, and serial data (SDA) is transmitted in both directions between the control and power source section 21 and the communication section 9. In the present embodiment, the control and power source section 21 polls the communication section 9 with a 2 sec period and reads-in the contents of the communication section 9 registers. The 2 sec polling period is a value set by the control and power source section 21. For example, this polling transfers rechargeable battery 1 remaining capacity data from the communication section 9 to the control and power source section 21 every 2 sec, and the remaining capacity value is indicated as a percentage by a display (not illustrated) in the electrical equipment 20.

Charging current target values set in the control section 5, namely, the set current data, are sent to the control and power source section 21 via the communication section 9 in the same manner as the remaining capacity data. The control and power source section 21 performs constant current charging of the rechargeable battery 1 based on the set current values sent from the control section 5. In the polling described above, when matching data is received two consecutive times, the control and power source section 21 accepts that data. Accordingly, there is 2 sec to 4 sec (2×2 sec) time delay for control section 5 set current to be accepted by the control and power source section 21 and reflected in the value of the charging current. In actuality, since there is also delay internal to the control and power source section 21, that delay is added for a total maximum delay time of approximately 5 sec to 6 sec.

Figure 2:
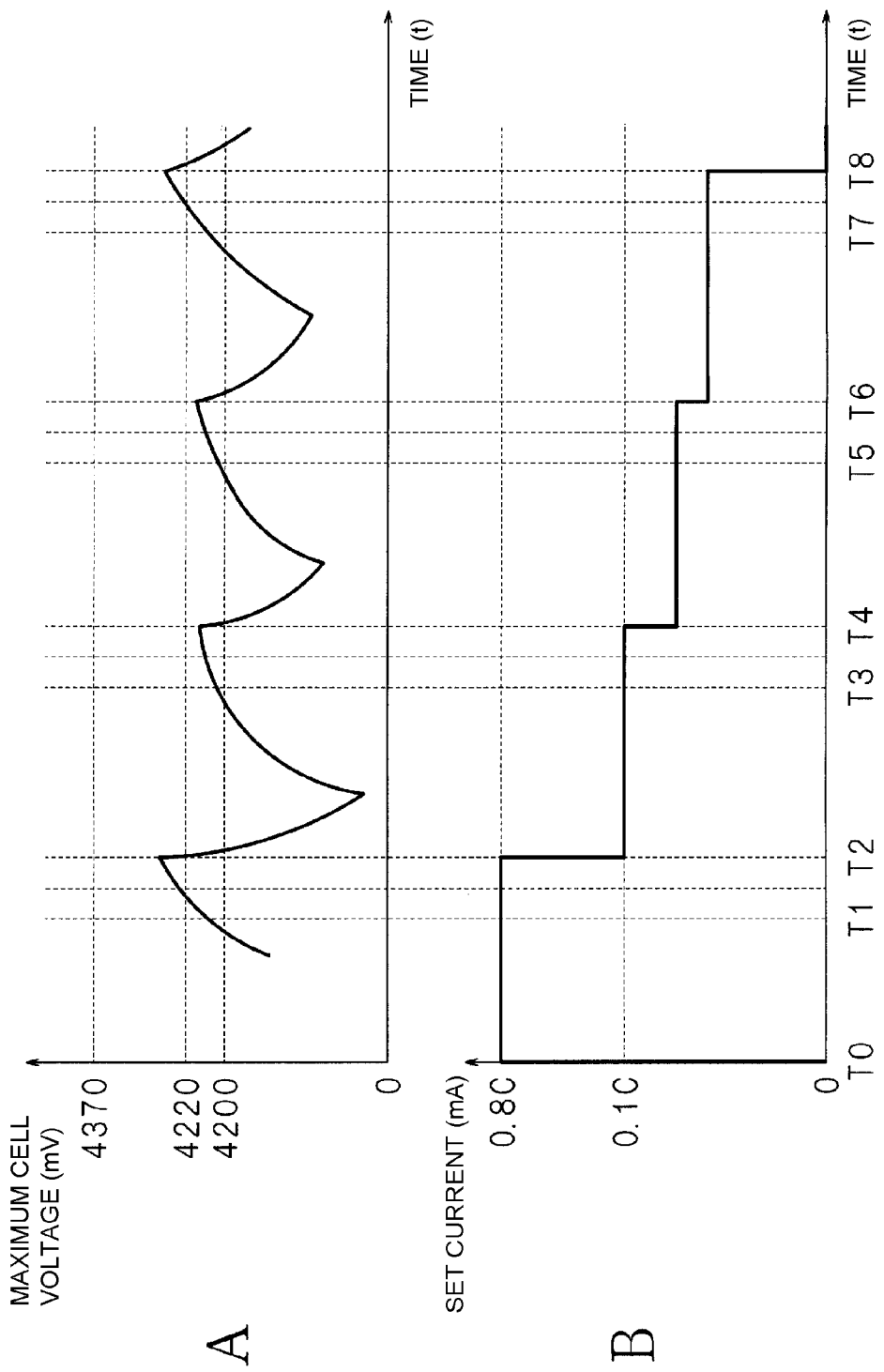
FIG. 2A is a graph showing typical variation in maximum cell voltage over time in the battery pack of a comparison example for the present invention, B is a graph showing an example of set current reduction in the comparison example.

The following describes methods of increasing and decreasing the set current to charge the rechargeable battery 1 in a battery pack 10. FIG. 2A is a graph showing typical variation in maximum cell voltage over time in the battery pack 10 of a comparison example for the present invention, and FIG. 2B is a graph showing an example of set current reduction in the comparison example. The vertical axes of the figures show maximum cell voltage (mV) and set current (mA), and the horizontal axes indicate time (t). Here, (C) designates the discharge rate (C-rate or charge rate). For example, 0.5C indicates the amount of current (mA) that can be supplied over a 2 hr (=1/0.5) time period with charge equivalent to the capacity (mAh) of the battery blocks 11, 12, 13. Further, the set current means the maximum set current, which is the value that the maximum charging current is controlled not to exceed.

In FIG. 2A, 4370 mV is the charging voltage, 4220 mV is the protection voltage that battery voltage should not exceed, and 4200 mV is the voltage (threshold voltage) that triggers reduction in the set current. As described above, the maximum cell voltage is determined with 250 ms periodicity (the time interval between adjacent vertical broken lines) and stored in RAM 53. In addition, the vertical broken lines indicate time points where decisions are made based on the magnitude of the maximum cell voltage. The length of each time interval T1 to T2, T3 to T4, T5 to T6, and T7 to T8 is 500 ms (2×250 ms).

In the comparison example shown in FIGS. 2A and 2B, charging is started with a set current determined according to rechargeable battery 1 maximum cell voltage and battery temperature, and the set current is reduced according to the detected maximum cell voltage. The set current at the start of charging is made high or low depending on whether the maximum cell voltage is low or high and depending on whether the battery temperature is high or low respectively. The maximum cell voltage is the maximum cell voltage when the rechargeable battery 1 is not being charged. However, during discharging the maximum cell voltage that has the voltage generated by rechargeable battery 1 internal resistance subtracted is lower than the actual maximum cell voltage. As one example of detrimental effects resulting from this situation, consider electrical equipment (PC) 20 operating on current discharged from the rechargeable battery 1. If, for example, a charging adapter (not illustrated) is connected to the control and power source section 21 and charging is suddenly started, the rechargeable battery 1, which was being discharged, is abruptly switched to charging. In this case, depending on measurement and computation timing, it is possible for the maximum cell voltage during discharging to be detected as the maximum cell voltage for starting charging, and the charging current could be set according to that detection result. Accordingly, when charging is started with a set current that is larger than the appropriate set current, it is possible for the maximum cell voltage to exceed the protection voltage.

For example, when maximum cell voltage, which is revised with 250 ms periodicity, is judged higher than the threshold voltage (4200 mV) three consecutive times up to time T2, maximum cell voltage exceeding the threshold voltage is detected. Similarly, when maximum cell voltage revised with 250 ms periodicity is judged higher than the protection voltage (4220 mV) two consecutive times up to time T2, maximum cell voltage exceeding the protection voltage is detected. In the present comparison example, when maximum cell voltage exceeding the protection voltage and maximum cell voltage exceeding the threshold voltage are detected with timing that conflicts, maximum cell voltage exceeding the protection voltage is detected first. As described below, charging is not stopped even though maximum cell voltage is judged in excess of the protection voltage two consecutive times (at time T2) at the beginning of charging. This is in consideration of the previously described case of a discharging rechargeable battery 1 abruptly switched to charging. Due to the timing of operations such as measurement and computation, there is a possibility that the maximum cell voltage during discharging could be used as the maximum cell voltage to set the charging current at the start of charging. When charging is started with a set current larger than the appropriate set current, it is possible for the maximum cell voltage to exceed the protection voltage.

In the present comparison example, when maximum cell voltage exceeding the protection voltage is detected at time T2, the set current is unconditionally reduced to 0.1C. This avoids maximum cell voltage exceeding the protection voltage as much as possible even though charging is continued. Subsequently, during continued charging with set current reduced to 0.1C, maximum cell voltage exceeding the threshold voltage (4200 mV) is detected at times T4 and T6. At those time points, the set current is further reduced and charging is continued to increase the effective capacity of the rechargeable battery 1. Here, for example, set current is reduced by multiplying the initial value by a factor of 0.9. During continued charging with the set current reduced below 0.1C, when maximum cell voltage exceeding the protection voltage is detected at time T8, charging is forcibly stopped.

As described in the comparison example above, since charging is started with the maximum set current, maximum cell voltage can exceed the protection voltage prior to set current reduction over the entire charging period, and if the value of the set current at the start of charging is reduced, the time required for charging tends to become longer. Further, when values of the set current to start charging are predetermined based on maximum cell voltage and battery temperature, subtle complex adjustments are required.

Figure 3:
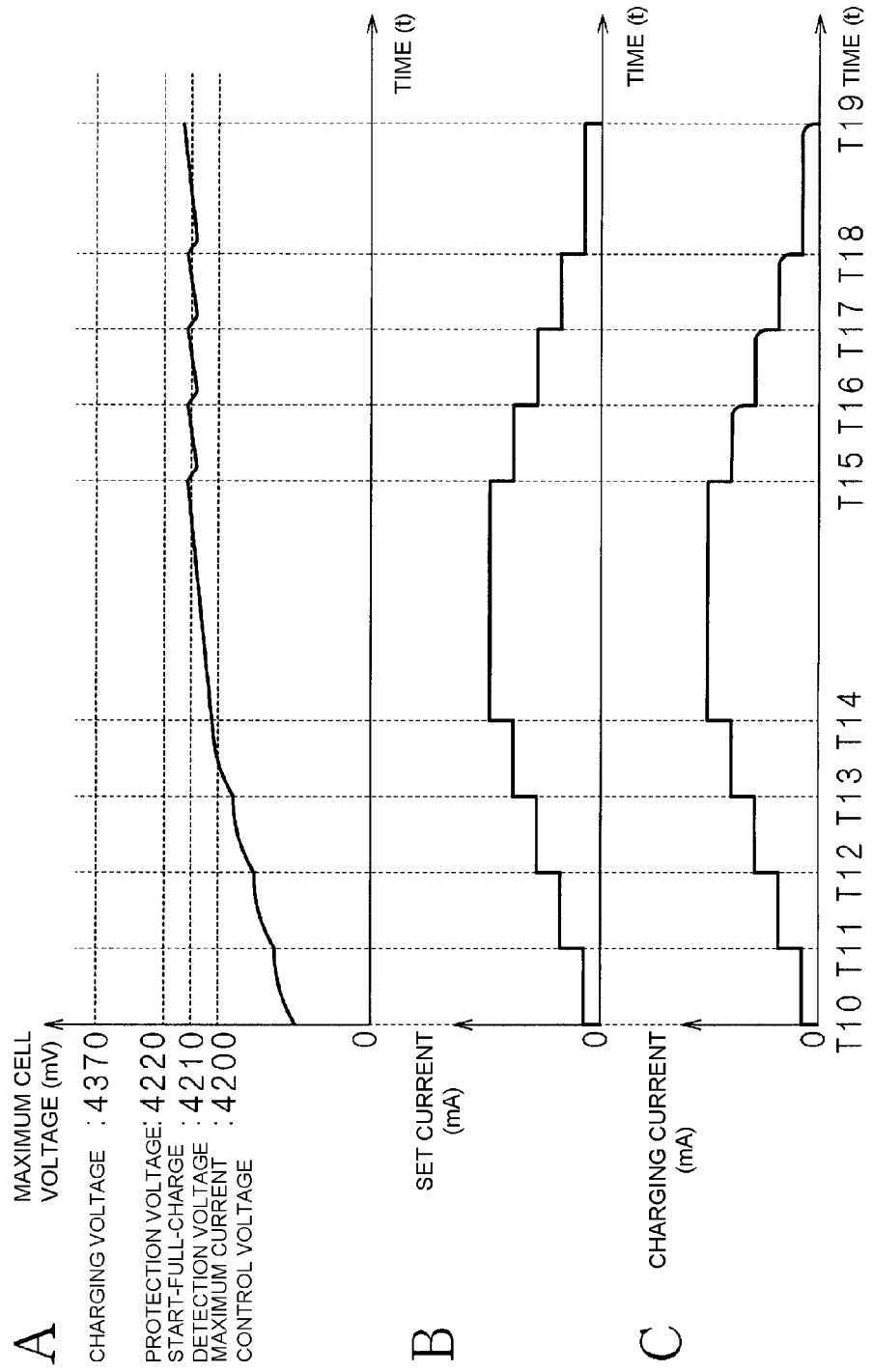
FIG. 3A is a graph showing typical variation in maximum cell voltage over time in a battery pack for the present invention, B is graph showing an example of increase and reduction in the set current, C is a graph showing an example of increase and reduction in the charging current corresponding to the set current.

The following describes the method of charging the rechargeable battery 1 provided in a battery pack 10 for the present invention. FIG. 3A is a graph showing typical variation in maximum cell voltage over time in a battery pack 10 for the present invention, FIG. 3B is graph showing an example of increase and reduction in the set current, and FIG. 3C is a graph showing an example of increase and reduction in the charging current corresponding to the set current. The vertical axes of the figures show maximum cell voltage (mV), set current (mA), and charging current (mA); and the horizontal axes indicate time (t). Of the voltages shown on the vertical axis of FIG. 3A, 4370 mV and 4220 mV are the same as the charging voltage and protection voltage respectively in FIG. 2A. 4210 mV (second voltage) is the voltage for starting full-charge detection (start-full-charge detection voltage), and 4200 mV (designated voltage) is the upper limit voltage for increasing the set current (maximum current control voltage). The times T10 to T19 are the time points where the set current is changed.

In this embodiment, rechargeable battery 1 charging is started using the smallest possible set current regardless of the maximum cell voltage or battery temperature at the start of charging, and the set current is increased at constant time intervals if the detected maximum cell voltage is less than or equal to the maximum current control voltage. Further, when maximum cell voltage becomes greater than the start-full-charge detection voltage, the set current is reduced, and when the charging current remains below a prescribed current for a given time period or longer, the rechargeable battery 1 is determined to be fully-charged. During this time, if the maximum cell voltage rises above the protection voltage, the rechargeable battery 1 is determined to be in an over-charged condition. When cell-to-cell variation has developed in a general multi-cell battery pack, full-charge detection that proceeds at the start-full-charge detection voltage detects charging current reduced to a somewhat low level to determine full-charge and prevent further over-charging. This is different from normal full-charge detection. As described previously in relation to charging adapter connection (with internal resistance), the maximum cell voltage detected during charging is higher than the actual value, and full-charge detection based on maximum cell voltage alone can detect full-charge even when the charge capacity is insufficient. Accordingly, by detecting charging current reduced to a low level, detection of full-charge with insufficient charge capacity is prevented. Incidentally, normal full-charge detection determines full-charge when, for example, maximum cell voltage is greater than or equal to 4.1V and charging current is less than or equal to 50 mA/cell continuously for a time period on the order of 20 sec.

The following describes the time-order of events in specific terms. As described previously, there is a 5 sec to 6 sec delay time for an increase or reduction in the set current to actually be implemented by a change in charging current. Therefore, the present embodiment provides a 6 sec waiting time from the time the set current is increased until the next decision is made. Accordingly, each time interval T10 to T11, T11 to T12, T12 to T13, and T13 to T14 is 6 sec. In contrast, after the set current has been reduced once, the next reduction is performed when the maximum cell voltage becomes greater than the start-full-charge detection voltage, and the time intervals T15 to T16, T16 to T17, and T17 to T18 are not constant.

In FIG. 3B, each time point where the set current changes indicates the point in time where the control and power source section 21 has accepted a change in the set current and reflected that by changing the charging current. Specifically, the decision to increase or decrease the set current is made several seconds (5 sec to 6 sec) prior to each time point shown in FIG. 3B. Further, although not evident from the figures, it should be clear that the number of steps for current increase (5 steps in FIG. 3B) is high or low depending on the whether the maximum cell voltage at the start of charging is low or high and the whether the amount of set current increase in each step is small or large respectively. Turning to FIG. 3C, the charging current is controlled not to exceed the set current, and since charging current and set current are essentially co-dependent, further description of the charging current is abbreviated.

Initially, the set current is established at the minimum value at time T10, and the maximum cell voltage starts to rise as charging current begins to flow. However, unlike the comparison example of FIG. 2A, the maximum cell voltage in the time interval from T10 to T11 does not exceed the protection voltage because the initial charging current is sufficiently small. Since the maximum cell voltage at each decision point several seconds prior to each time point T11, T12, T13, and T14 is at or below the maximum current control voltage, the set current is increased by one level (step) at each point. The set current is not increased after time T14 because the maximum cell voltage has previously exceeded the maximum current control voltage.

After time T14, since the maximum cell voltage has become greater than the start-full-charge detection voltage at the decision points several seconds prior to each of the time points T15, T16, T17, and T18, the set current is reduced by one level (step). Each time the set current is reduced one level; the maximum cell voltage initially decreases but soon begins to rise again. The set current is reduced to the minimum value after time T18. At the decision point several seconds prior to time T19, when charging current less than a prescribed current is detected for a given time period or longer, the rechargeable battery 1 is determined to be fully-charged, and the set current is reduced to zero.

Figure 4:
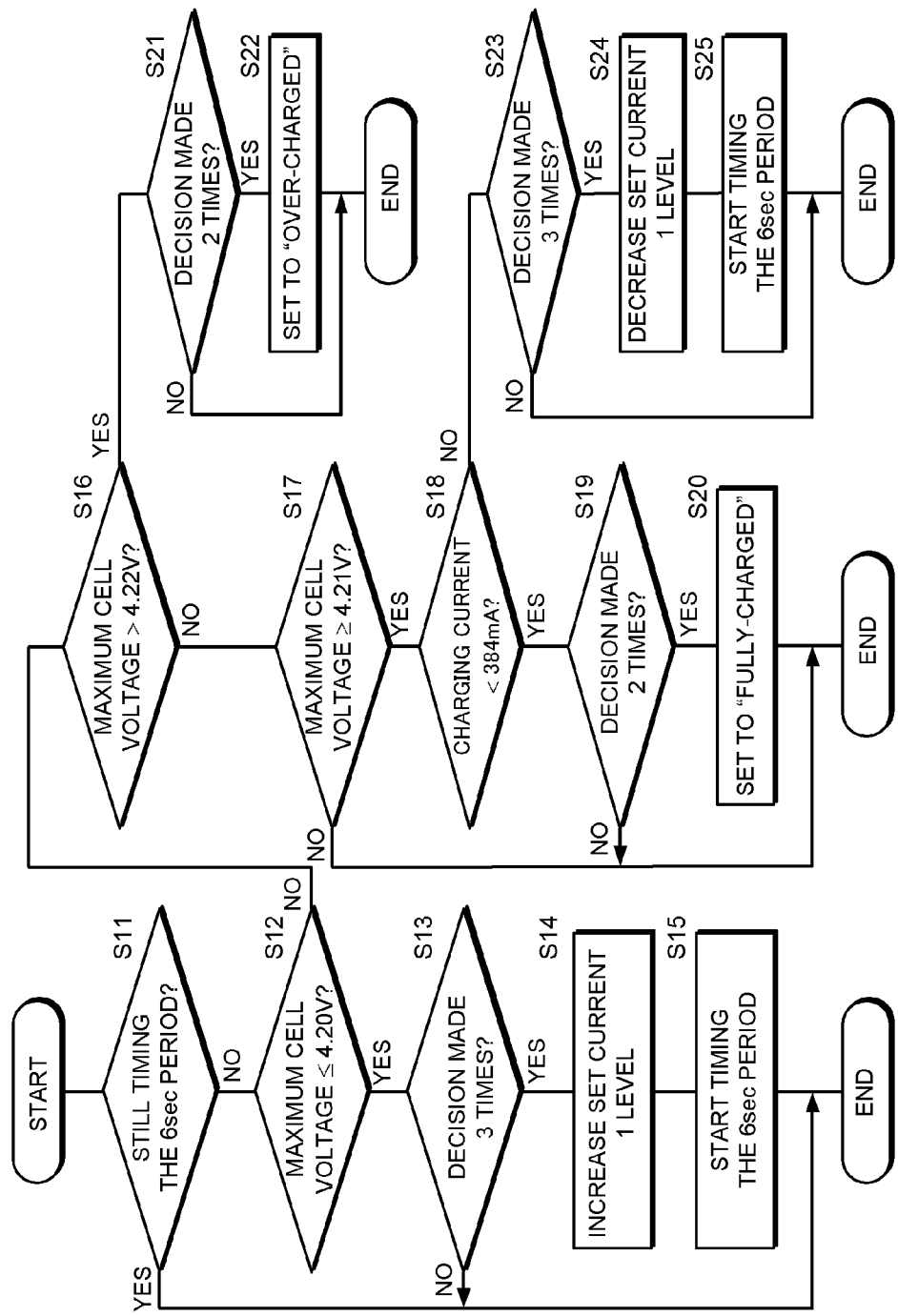
FIG. 4 is a flow-chart showing central processing unit (CPU) processing steps to increase and reduce set current a step at a time in a battery pack for the present invention.

The following describes operation of the control section 5 of the battery pack 10 described above using a flow-chart. Processing described below is performed by the CPU 51 according to a control program pre-stored in ROM 52. FIG. 4 is a flow-chart showing CPU 51 processing steps to increase and reduce set current a step at a time in a battery pack 10 for the present invention. Processing in FIG. 4 is activated, for example, when communication between the communication section 9 and the control and power source section 21 has been established after attachment of the battery pack 10 to the electrical equipment 20. FIG. 4 processing is activated with 250 ms periodicity after the control section 5 has received charging instruction from the control and power source section 21 via the communication section 9. However, the period for activating processing is not limited to 250 ms. As described previously, the maximum cell voltage used in the processing below is stored in RAM 53 and revised when appropriate.

In FIG. 4, the detected maximum cell voltage is compared with the maximum current control voltage (designated voltage: 4.20V), the start-full-charge detection voltage (second voltage: 4.21V), and the protection voltage (4.22V) to judge which is higher or lower, and a count is kept of the number of times each decision is made. Since activating the processing in FIG. 4 one time is a count of one, even when decisions are made in succession, a count difference of one converts to decision time continued for 250 ms. However, since the point in time within the 250 ms period where the conditions for making a decision are first satisfied is unknown, a count of one is equivalent to a continuous decision time of 0 to 250 ms (from a time indefinitely close to 0 to a time indefinitely close to 250 ms). When the count reaches a predetermined value depending on the voltage being compared, the set current is increased by one level (or decreased by one level), full-charge is detected, or an over-charged condition is determined.

When FIG. 4 processing is activated, the CPU 51 judges whether or not the timer 54 is still timing the 6 sec time period (S11). If the timer 54 is still timing (S11: YES), FIG. 4 processing is ended and processing waits for the next activation (similarly, steps described below that end FIG. 4 processing also imply waiting for the next activation). Timing for 6 sec by the timer 54 is started in steps S15 and S25 described below. When FIG. 4 processing is activated for the first time, timing has not been started by the timer 54 and the set current is the minimum value (128 mA).

When the timer 54 is not still timing the 6 sec time period (S11: NO), the CPU 51 judges whether or not the maximum cell voltage is less than or equal to the maximum current control voltage (4.20V) (S12). If the maximum cell voltage is less than or equal to 4.20V (S12: YES), the CPU 51 judges whether or not the decision made in step S12 has had a positive outcome three times (S13). The count of the number of times the decision in step S12 has a positive outcome is initially stored as zero in RAM 53, is incremented by one when the step S12 decision is YES, and is re-initialized to zero when the decision is NO. (Decision counts used in other steps described below are also handled in the same manner.)

In step S13, if the decision has not had a positive outcome three times (S13: NO); namely, if a positive decision has been made one or two times, the CPU 51 ends FIG. 4 processing. If a positive decision has been made three times (S13: YES), the CPU 51 accepts that maximum cell voltage has not risen to the maximum current control voltage, increases the set current one level (S14), and sends the set current data from the communication section 9 to the control and power source section 21. In the present embodiment, the amount of set current increase is 128 mA per level. Step S13 confirmation that the decision in step S12, which is executed with 250 ms periodicity, has a positive outcome three consecutive times insures that the step S12 decision has not changed for a period of 500 ms to 750 ms (corresponding to time period t1). However, this count value is not necessarily limited to three.

Subsequently, the CPU 51 starts timing the 6 sec time period with the timer 54 (S15) and ends FIG. 4 processing. As described previously, starting 6 sec timing prior to ending processing establishes a 6 sec wait from the time the set current is increased until the next decision is made. This waiting time is actually implemented by step S11.

In step S12, if the maximum cell voltage is not less than or equal to 4.20V (S12: NO), the CPU 51 judges whether or not the maximum cell voltage is greater than the protection voltage (4.22V) (S16). If the maximum cell voltage is not greater than 4.22V (S16: NO), the CPU 51 judges whether or not the maximum cell voltage is greater than or equal to the start-full-charge detection voltage (4.21V) (S17). If the maximum cell voltage is not greater than or equal to 4.21V (S17: NO); namely, when maximum cell voltage is below the start-full-charge detection voltage, FIG. 4 processing is ended.

If the maximum cell voltage is greater than or equal to 4.21V (S17: YES), the CPU 51 judges whether or not the charging current detected by the current detector 2 is less than 384 mA (S18). Here, rechargeable battery 1 maximum cell voltage has exceeded the start-full-charge detection voltage, and this judgment determines whether or not the charging current has decreased to the end-of-charging current value. The charging current decision value of 384 mA is the minimum set current of 128 mA added to the control and power source section 21 charging current increase and decrease magnitude (256 mA).

In step S18, if the charging current is less than 384 mA (S18: YES), the CPU 51 judges whether or not the decision made in step S18 has had a positive outcome two times (250 ms to 500 ms corresponding to time period t3) (S19). If a positive decision has not been made two times (S19: NO); namely, if it is the first positive decision, FIG. 4 processing is ended. Here, the count value for positive decision in step S19 is not limited to two. When the decision made in step S19 has a positive outcome two times (S19: YES), the CPU 51 sets RAM 53 to indicate that the rechargeable battery 1 is fully-charged (S20) and ends FIG. 4 processing. In this case, the CPU 51 transmits data indicating completion of charging to the control and power source section 21 and switches MOSFET 71 to the OFF state.

In step S18, when the charging current is not less than 384 mA (S18: NO), the CPU 51 judges whether or not the decision made in step S17 has had a positive outcome three times (500 ms to 750 ms corresponding to time period t2) (S23). If a positive decision has not been made three times (S23: NO); namely, if a positive decision has been made one or two times, FIG. 4 processing is ended. In step S23, the count value for positive decision is not limited to three. When the decision made in step S17 has had a positive outcome three times (S23: YES), the CPU 51 accepts that maximum cell voltage has risen to the start-full-charge detection voltage or greater, reduces the set current one level (S24), and sends the set current data from the communication section 9 to the control and power source section 21. Subsequently, the CPU 51 starts timing the 6 sec time period with the timer 54 (S25) and ends FIG. 4 processing.

Turning back to step S16, if the maximum cell voltage is greater than or equal to 4.22V (S16: YES), the CPU 51 judges whether or not that step S16 decision has had a positive outcome two times (250 ms to 500 ms corresponding to time period t4) (S21). If a positive decision has not been made two times (S21: NO); namely, if it is the first positive decision, FIG. 4 processing is ended. The value of the decision count in step S21 is made lower than the value of the count in step S23. This is to assure that a rechargeable battery 1 over-charged condition is detected promptly. When the decision made in step S16 has a positive outcome two times (S21: YES), the CPU 51 sets RAM 53 to indicate that the rechargeable battery 1 is in an over-charged condition (S22) and ends FIG. 4 processing. In this case, the CPU 51 transmits data indicating completion of charging to the control and power source section 21 and switches MOSFET 71 to the OFF state.

As described above for the present embodiment, when the maximum cell voltage is less than or equal to the maximum current control voltage (designated voltage: 4.20V), which is lower than the protection voltage (4.22V), three consecutive times, and each time is executed with a 250 ms period, the set current is increased. If, for example, the amount of set current increase is 128 mA and the time interval between current increase is 6 sec, this procedure can increase the maximum cell voltage without having it rise to the protection voltage (4.22V), even though it may somewhat exceed the maximum current control voltage (4.20). Accordingly, by either making the increase in set current appropriately large or the time period for increasing the set current appropriately short, the set current can be rapidly increased to keep battery voltage within a range that does not exceed the maximum allowable voltage (4.22V). Consequently, charging can be completed in a short time period.

Further, when the maximum cell voltage is below the protection voltage (4.22V) but greater than or equal to the start-full-charge detection voltage (4.21V), which is higher than the maximum current control voltage (4.20V), three consecutive times with a 250 ms period, the set current is decreased. Accordingly, the set current can be reduced consistent with progression towards full-charge while charging in accordance with constant current charging.

Further, when maximum cell voltage is greater than or equal to the start-full-charge detection voltage (4.21V) and the charging current is below 384 mA two consecutive times with a 250 ms period, full-charge of the rechargeable battery is detected. Accordingly, it is possible to detect full-charge by acquiring the variation in diminishing charging current near the end of charging.

Still further, when the maximum cell voltage is greater than the protection voltage (4.22V) and that condition persists two consecutive times with a 250 ms period, rechargeable battery over-charging is detected. In this case, since the consecutive decision count (two times) is less than the consecutive decision count (three times) for increasing the set current, maximum cell voltage exceeding the protection voltage is detected first. Consequently, it is possible to reliably detect rechargeable battery voltage exceeding the protection voltage.

In addition, the rechargeable battery is charged by set current, which is increased by the charging control apparatus. Accordingly, a charging control apparatus, which can keep rechargeable battery voltage from rising to the protection voltage (4.22V) even though it may rise somewhat above the maximum current control voltage (4.20), can be used in a battery pack.

In the present embodiment, although rechargeable battery 1 charging is started with a minimum set current (128 mA), it is not limited to that starting current. For example, rechargeable battery 1 maximum cell voltage can be detected, and the set current for starting charging can be made high or low depending on whether the detected maximum cell voltage is low or high respectively. In addition, although set current is increased in current levels of uniform value, the present invention is not limited to that scheme. For example, the amount of maximum cell voltage rise resulting from an initial single level of set current can be detected to estimate the rechargeable battery 1 internal resistance, and the amount of set current increase can be made large or small depending on whether the estimated internal resistance is small or large respectively. Further, although the time interval for set current increase is 6 sec, a different appropriately selected time interval can be also used.

In the present embodiment, although step S12 (for example) in the flowchart of FIG. 4 judges whether or not maximum cell voltage is less than or equal to 4.20V, that step could instead judge whether or not the maximum cell voltage is less than 4.20V. (Step S17 can similarly be implemented with or without the equal sign.) Further, step S16 could instead judge whether or not maximum cell voltage is greater than or equal to 4.22V, and step S18 could judge whether or not charging current is less than or equal to 384 mA.

Finally, in the present embodiment, the number of times voltage comparison in flowchart step S12 (for example) has a positive outcome is counted (decision count), and whether or not positive outcome is continuous for 500 ms to 750 ms is determined by whether or not the decision count is three in the following step S13. However, the method of making judgments related to the time that a voltage comparison continuously has a positive outcome is not limited to that method. For example, when the voltage comparison in step S12 initially has a positive outcome, the timer 54 can be started with the time period set to 500 ms to 750 ms. Then it can be judged whether or not the voltage comparison in step S12 continues to have a positive outcome until the timer 54 times-out.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2011-144,724 filed in Japan on Jun. 29, 2011, the content of which is incorporated herein by reference.

What is claimed is:

1. A rechargeable battery charging method for detecting battery voltage as a time-series and charging a rechargeable battery with a first set current, the method comprising:

periodically reading a detected voltage by a control section of a computer device;

setting a first current value to charge the rechargeable battery at a start of charging by the control section, wherein the first current value is set independent of the detected voltage;

detecting a first state where the detected voltage is less than or equal to a first voltage by the control section, the first voltage being an upper limit voltage value for increasing the set current and being set lower than a protection voltage, the protection voltage having a voltage value that protects the rechargeable battery from over-charging;

counting a first period during the first state detected by the control section; and increasing the set first current to a second set current value which is higher than the first set current value by the control section where the first period during the first state is equal to or greater than a first time period t1, wherein the set current is not increased after detecting the first voltage is exceeded.

2. The rechargeable battery charging method according to claim 1, further comprising:

detecting, by the control section, a second state where the detected voltage is lower than the protection voltage but greater than or equal to a second voltage, the second voltage having a voltage value for starting full-charge detection and which is set greater than the first voltage;

counting a second period during the second state detected by the control section; and reducing the set current to a third set current value which is lower than the second set current by the control section when the second period during the second state is equal to or greater than a second time period t2.

3. The rechargeable battery charging method according to claim 2, wherein rechargeable battery charging current is detected as a time-series by the control section, further comprising:

detecting, by the control section, a third state where the detected current is below a prescribed current when the detected voltage is greater than or equal to the second voltage, the prescribed current being a current value to judge full-charge of the rechargeable battery;

counting a third period during the third state detected by the control section; and detecting the full-charge of the rechargeable battery by the control section when the third period during the third state is equal to or greater than a third time period t3.

4. The rechargeable battery charging method according to claim 1, further comprising:

detecting a fourth state where the detected voltage is greater than the protection voltage by the control section;

counting a fourth period during the fourth state detected by the control section; and detecting an over-charged condition for the rechargeable battery by the control section when the fourth period during the fourth state is equal to or greater than a fourth time period t4, wherein t4 is less than t1.

5. A charging control apparatus that detects battery voltage as a time-series and charges the rechargeable battery with a first set current, comprising:

a voltage detection unit to periodically detect a voltage;

a control unit to set a first current value to charge the rechargeable battery at a start of charging, the first current value being independent of the detected voltage, and to detect a first state where the detected voltage is less than or equal to a first voltage, the first voltage being an upper limit voltage value for increasing the set current, and the first voltage being set lower than a protection voltage, wherein the protection voltage is a voltage value for protecting the rechargeable battery from over-charging; and a timer unit to count a first period during the first state, wherein the control unit has a current controlling unit to increase the set current to a second set current value which is higher than the first set current value when the first period during the first state is equal to or greater than a first time period t1, and not increase the set current when the detected voltage is greater than the first voltage.

6. The charging control apparatus of claim 5, wherein the timer unit is further configured to count a second period during a second state where the detected voltage is lower than the protection voltage but greater than or equal to a second voltage, the second voltage being a voltage value for starting full-charge detection and the second voltage is set greater than the first voltage; and wherein the control unit is configured to reduce the set current to a third set current value which is lower than the second set current when the second period during the second state is equal to greater than a second time period t2.

7. A battery pack comprising:

the charging control apparatus of claim 5; and one or more rechargeable batteries charged by a set current increased by the charging control apparatus.

* * * * *